(12) United States Patent
Renn

(10) Patent No.: US 7,662,195 B2
(45) Date of Patent: Feb. 16, 2010

(54) METHANOL STEAM REFORMING CATALYSTS, STEAM REFORMERS, AND FUEL CELL SYSTEMS INCORPORATING THE SAME

(75) Inventor: Curtiss Renn, Bend, OR (US)

(73) Assignee: Idatech, LLC, Bend, OR (US)

( * ) Notice: Subject to any disclaimer, the term of this patent is extended or adjusted under 35 U.S.C. 154(b) by 0 days.

(21) Appl. No.: 11/474,024

(22) Filed: Jun. 23, 2006

(65) Prior Publication Data

US 2006/0236607 A1 Oct. 26, 2006

Related U.S. Application Data

(63) Continuation of application No. 10/600,808, filed on Jun. 20, 2003, now Pat. No. 7,128,769.

(60) Provisional application No. 60/392,482, filed on Jun. 27, 2002.

(51) Int. Cl.
*B01J 8/00* (2006.01)
*B01J 7/00* (2006.01)
*H01M 8/06* (2006.01)
*C01B 3/36* (2006.01)
*C10J 3/46* (2006.01)
*C10J 3/54* (2006.01)
*B01J 23/00* (2006.01)
*B01J 23/06* (2006.01)
*B01J 23/70* (2006.01)

(52) U.S. Cl. .................... 48/127.9; 48/61; 48/197 R; 502/300; 502/307; 502/318; 502/319; 502/343; 502/345

(58) Field of Classification Search ............... 48/127.9, 48/61, 197 R
See application file for complete search history.

(56) References Cited

U.S. PATENT DOCUMENTS 2,824,620 A 2/1958 De Rosset .................. 95/56

(Continued)

FOREIGN PATENT DOCUMENTS

DE 877746 5/1953

(Continued)

OTHER PUBLICATIONS

English-language abstract of Japanese Patent No. JP 3-131501, 1991.

(Continued)

*Primary Examiner*—Jennifer K Michener
*Assistant Examiner*—Matthew J Merkling
(74) *Attorney, Agent, or Firm*—Dascenzo Intellectual Property Law, P.C.

(57) ABSTRACT

Methanol steam reforming catalysts, and steam reformers and fuel cell systems incorporating the same. In some embodiments, the methanol steam reforming catalyst includes zinc oxide as an active component. In some embodiments, the methanol steam reforming catalyst further includes at least one of chromium oxide and calcium aluminate. In some embodiments, the methanol steam reforming catalyst is not pyrophoric. Similarly, in some embodiments, steam reformers including a reforming catalyst according to the present disclosure may include an air-permeable or air-accessible reforming catalyst bed. In some embodiments, the methanol steam reforming catalyst is not reduced during use. In some embodiments, the methanol reforming catalysts are not active at temperatures below 275° C. In some embodiments, the methanol steam reforming catalyst includes a sulfur-absorbent material. Steam reformers, reforming systems, fuel cell systems and methods of using the reforming catalysts are also disclosed.

22 Claims, 1 Drawing Sheet

U.S. PATENT DOCUMENTS

| | | | | |
|---|---|---|---|---|
| 3,094,391 A | 6/1963 | Mader | | 48/127.9 |
| 3,336,730 A | 8/1967 | McBride et al. | | 95/56 |
| 3,338,681 A | 8/1967 | Kordesch | | 422/211 |
| 3,350,176 A | 10/1967 | Green et al. | | 422/109 |
| 3,469,944 A | 9/1969 | Bocard et al. | | 423/650 |
| 4,003,343 A | 1/1977 | Lee | | 123/3 |
| 4,098,959 A | 7/1978 | Fanciullo | | 429/25 |
| 4,098,960 A | 7/1978 | Gagnon | | 429/25 |
| 4,214,969 A | 7/1980 | Lawrance | | 204/255 |
| 4,349,613 A | 9/1982 | Winsel | | 429/17 |
| 4,417,905 A | 11/1983 | Banks et al. | | 48/214 A |
| 4,468,235 A | 8/1984 | Hill | | 95/46 |
| 4,716,859 A | 1/1988 | König et al. | | 123/3 |
| 4,743,576 A * | 5/1988 | Schneider et al. | | 502/242 |
| 4,780,300 A * | 10/1988 | Yokoyama et al. | | 423/418.2 |
| 4,847,000 A * | 7/1989 | Dang Vu et al. | | 252/373 |
| 4,946,667 A * | 8/1990 | Beshty | | 423/648.1 |
| 5,232,682 A * | 8/1993 | DuPont | | 423/648.1 |
| 5,401,589 A | 3/1995 | Palmer et al. | | 429/13 |
| 5,432,710 A | 7/1995 | Ishimaru et al. | | 705/412 |
| 5,637,414 A | 6/1997 | Inoue et al. | | 429/13 |
| 5,861,137 A | 1/1999 | Edlund | | 423/652 |
| 5,997,594 A | 12/1999 | Edlund et al. | | 48/76 |
| 6,083,637 A | 7/2000 | Walz et al. | | 429/17 |
| 6,152,995 A | 11/2000 | Edlund | | 96/4 |
| 6,221,117 B1 | 4/2001 | Edlund et al. | | 48/76 |
| 6,319,306 B1 | 11/2001 | Edlund et al. | | 96/7 |
| 6,383,670 B1 | 5/2002 | Edlund et al. | | 429/20 |
| 6,413,449 B1 | 7/2002 | Wieland et al. | | 252/373 |
| 6,419,728 B1 | 7/2002 | Edlund | | 96/4 |
| 6,458,189 B1 | 10/2002 | Edlund et al. | | 96/7 |
| 6,537,352 B2 | 3/2003 | Edlund et al. | | 96/4 |
| 6,547,858 B1 | 4/2003 | Edlund et al. | | 96/4 |
| 6,770,106 B1 * | 8/2004 | Okamoto et al. | | 48/127.9 |
| 2001/0026782 A1 | 10/2001 | Wang et al. | | 422/211 |

FOREIGN PATENT DOCUMENTS

| | | |
|---|---|---|
| EP | 0409517 A1 | 7/1990 |
| EP | 0409517 B1 | 1/1991 |
| EP | 1063011 B1 | 12/2001 |
| JP | S51-68488 | 6/1976 |
| JP | 3-131501 | 6/1991 |
| JP | H03-131501 | 6/1991 |
| JP | H04-027434 | 1/1992 |
| JP | 2001-357306 | 6/2003 |
| WO | WO 0147800 A1 * | 7/2001 |
| WO | WO 02/26619 A2 | 4/2002 |

OTHER PUBLICATIONS

English-language abstract of Japanese patent application No. 2001-357306, Jun. 3, 2003.

English-language abstract of Japanese patent publication No. H04-027434, Jan. 30, 1992.

* cited by examiner

METHANOL STEAM REFORMING CATALYSTS, STEAM REFORMERS, AND FUEL CELL SYSTEMS INCORPORATING THE SAME

RELATED APPLICATION

This application is a continuation patent application that claims priority to similarly entitled U.S. patent application Ser. No. 10/600,808, which was filed on Jun. 20, 2003, now U.S. Pat. No. 7,128,769 and which claims priority to U.S. Provisional Patent Application Ser. No. 60/392,482, which was filed on Jun. 27, 2002. The complete disclosures of the above-identified patent applications are hereby incorporated by reference for all purposes.

FIELD OF THE DISCLOSURE

The present disclosure is directed generally to steam reformers and steam reforming or fuel cell systems incorporating the same, and more particularly to methanol steam reforming catalysts.

BACKGROUND OF THE DISCLOSURE

Purified hydrogen is used in the manufacture of many products including metals, edible fats and oils, and semiconductors and microelectronics. Purified hydrogen is also an important fuel source for many energy conversion devices. For example, many fuel cells use purified hydrogen and an oxidant to produce an electrical potential. A series of interconnected fuel cells is referred to as a fuel cell stack, and this stack may be referred to as a fuel cell system when combined with sources of oxidant and hydrogen gas. Various processes and devices may be used to produce the hydrogen gas that is consumed by the fuel cells.

One such device is a steam reformer, which reacts water and a carbon-containing feedstock in the presence of a steam reforming catalyst to produce a stream containing hydrogen gas. Examples of suitable carbon-containing feedstocks include alcohols and hydrocarbons. A particularly effective carbon-containing feedstock is methanol. Methanol steam reforming catalysts are typically low temperature shift (LTS) catalysts that have copper oxide as a primary active component. Although effective at reforming methanol and water into a reformate stream containing hydrogen gas, LTS catalysts are relatively quickly deactivated during use as a steam reforming catalyst and/or are pyrophoric. The catalysts may be deactivated by being reduced to an elemental metal, which may be sintered during further use of the catalyst. The pyrophoric nature of some LTS catalysts requires the catalysts to be shielded from contact with air when not being used so that the catalysts do not spontaneously combust.

SUMMARY OF THE DISCLOSURE

The present disclosure is directed to improved methanol steam reforming catalysts, as well as to steam reformers and fuel cell systems incorporating the same. In some embodiments, the methanol steam reforming catalyst includes zinc oxide as an active component. In some embodiments, the methanol steam reforming catalyst further includes at least one of chromium oxide and calcium aluminate. In some embodiments, the methanol steam reforming catalyst is not pyrophoric. Similarly, in some embodiments, steam reformers including a reforming catalyst according to the present disclosure may include an air-permeable or air-accessible reforming catalyst bed. In some embodiments, the methanol steam reforming catalyst is not reduced during use. In some embodiments, the methanol reforming catalysts are not active at temperatures below 275° C. In some embodiments, the methanol steam reforming catalyst includes a sulfur-absorbent material. Steam reformers, reforming systems, fuel cell systems and methods of using the reforming catalysts are also disclosed.

DETAILED DESCRIPTION AND BEST MODE OF THE DISCLOSURE

Figure 1:
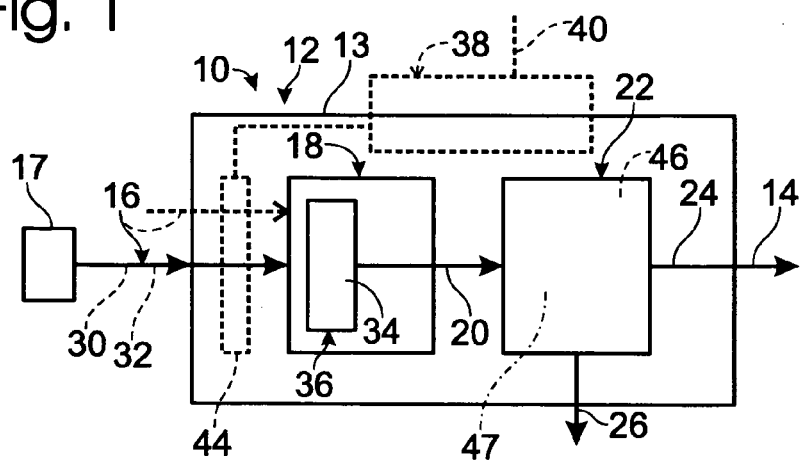
FIG. 1 is a schematic view of a fuel processing system that includes a steam reformer.

As used herein, a fuel processing system is a system that contains a fuel processor which is adapted to produce from a feed stream a product hydrogen stream that contains at least substantially hydrogen gas. An example of a suitable fuel processor is a steam reformer, which produces the product hydrogen stream by steam reforming a feed stream containing water and a carbon-containing feedstock. An example of a fuel processing system that contains a fuel processor in the form of a steam reformer is shown in FIG. 1 and generally indicated at 10. As shown, the fuel processing system, which in the illustrated embodiment may be referred to as a steam reforming system, contains a fuel processor 12 in the form of a steam reformer 13.

Steam reformer 13 produces a product hydrogen stream 14 from a feed stream 16, which as discussed contains water 30 and a carbon-containing feedstock 32. As schematically illustrated in FIG. 1, steam reformer 13 includes a hydrogen-producing, or steam reforming, region 18 that contains a steam reforming catalyst 34. Steam reforming catalyst 34 is adapted to produce a reformate stream 20 from the feed stream, which is delivered to the reforming region at an elevated temperature and pressure. As shown, the reforming region contains a reforming catalyst bed 36 to which feed stream 16 is delivered and in which the reformate stream is produced. Although only a single reforming catalyst bed 36 is shown in FIG. 1, it is within the scope of the disclosure that more than one such bed may be used.

Steam reforming reactions are typically performed at temperatures in the range of 200° C. and 800° C., and at pressures in the range of 50 psi and 1000 psi. Therefore, steam reformer 13 typically includes, or is in thermal communication with, a heating assembly 38, which is shown in dashed lines in FIG. 1. Heating assembly 38 is schematically illustrated in FIG. 1 to graphically depict that the heating assembly may be located within the steam reformer, external the steam reformer, or both. Heating assembly 38 may utilize any suitable heating mechanism or device to heat the steam reformer to a selected operating temperature. For example, heating assembly 38 may include a resistance heater, a burner or other combustion unit that produces a heated exhaust stream, heat exchange with a heated fluid stream, etc. In FIG. 1, heating assembly 38 is shown including a fuel stream 40, which will tend to vary in composition and type depending upon the mechanism(s) used to produce heat. For example, when the heating assembly 38 is a burner or otherwise creates heat by combustion, stream 40 will include a stream of a combustible fuel, such as an alcohol or hydrocarbon, and/or a combustible gas, such as hydrogen gas. When heating assembly 38 includes an electric resistance heater, then stream 40 will include an electrical connection to an electrical power source. In some embodiments, feed stream 16 may be delivered to the steam reformer at an elevated temperature, and accordingly may provide at least a portion of the required heat. When a burner or other combustion chamber is used, a fuel stream is consumed and a heated exhaust stream is produced. Feed stream 16 is vaporized prior to undergoing the reforming reaction, and heating assembly 38 may be adapted to heat and vaporize any liquid components of feed stream 16. This is schematically illustrated in dashed lines in FIG. 1 at 44.

As discussed above, steam reformers produce reformate stream 20 from water and a carbon-containing feedstock. Examples of suitable carbon-containing feedstocks include alcohols and hydrocarbons. Nonexclusive examples of suitable alcohols include methanol, ethanol, and polyols, such as ethylene glycol and propylene glycol. Nonexclusive examples of suitable hydrocarbons include methane, propane, natural gas, diesel, kerosene, gasoline and the like. Methanol is a particularly well-suited carbon-containing feedstock for steam reforming reactions. Methanol steam reforming typically takes place at a lower temperature than when other carbon-containing feedstocks are reformed. For example, methanol steam reformers typically have reforming regions that are heated to approximately 300-500° C. (such as by heating assembly 38), and more commonly 350-425° C. Methanol steam reformers typically receive a feed stream 16 having approximately a 1:1 molar ratio of methanol to water (or approximately 64% methanol by weight), but this feed ratio may be varied without departing from the scope of the present disclosure and still produce sufficient amounts of hydrogen gas.

Feed stream 16 may be delivered to steam reformer 13 via any suitable mechanism, such as by a suitable feed stream delivery system, as schematically illustrated in FIG. 1 at 17. Delivery system 17 includes any suitable mechanism, device, or combination thereof that delivers the feed stream to steam reformer 13. For example, the delivery system may include one or more pumps that deliver the components of stream 16 from one or more supplies. Additionally, or alternatively, system 17 may include a valve assembly adapted to regulate the flow of the components from a pressurized supply. The supplies may be located external of the steam reforming system, or may be contained within or adjacent the system. A single feed stream 16 is shown in FIG. 1, but it is within the scope of the present disclosure that more than one stream 16 may be used and that these streams may contain the same or different components. In the case of a methanol steam reformer, where feed stream 16 contains water and methanol, these components may be mixed together and delivered as a single stream. Alternatively, these components may be separately delivered to the reforming region, as shown schematically in dashed lines in FIG. 1.

Traditionally, low temperature shift catalysts (LTS) have been used as methanol steam reforming catalysts. These catalysts were designed to catalytically facilitate the conversion of water and carbon monoxide to hydrogen and carbon dioxide at temperatures less than 275° C., such as in the range of 200-275° C. These catalysts typically are copper-based compositions, such as stabilized compositions of copper and zinc. More particularly, LTS catalysts typically include copper oxide and zinc oxide supported on alumina. LTS catalysts are available in various shapes and forms, such as pellets, powders, etc. Typically, LTS catalysts containing copper and zinc will include approximately 10-90% copper (I) and/or copper (II) oxide and approximately 10-90% zinc oxide. As used herein, "copper oxide" shall mean copper (I) and/or copper (II) oxide. The LTS catalysts may further include other materials, such as 0-50% alumina. Other examples of LTS catalysts may be described as containing 20-60% copper oxide, 20-50% copper oxide, or 20-40% copper oxide. Still others include these illustrative ranges of copper oxide and 20-60% zinc oxide, 20-50% zinc oxide or 30-60% zinc oxide. Other LTS catalysts contain chromium instead of the copper-zinc formulations described above. An example of a conventional LTS catalyst is made by ICI Chemicals & Polymers, Ltd. of Billingham, England and sold under the trade name 52-1. This LTS catalyst contains approximately 30% copper (II) oxide, approximately 45% zinc oxide and approximately 13% alumina. Another example of a LTS catalyst is K3-110, which is made and sold by BASF Corporation. Other examples include G66B and T-2617, which are made and sold by Süd-Chemie, Inc., of Louisville, Ky. Unless otherwise specified herein, all composition percentages are expressed in wt %.

Although effective for relatively short periods of use (such as up to approximately 200 hours), LTS catalysts also introduce several difficulties to practical long-term (1000 hours or more, and preferably 5000 hours or more) use of these catalysts as methanol steam reforming catalysts in commercial products. For example, the copper-zinc LTS catalysts described above are pyrophoric, which means that these catalysts will spontaneously combust in the presence of air. The heat produced by this spontaneous combustion (or oxidation) of the catalyst may damage the catalyst and/or other portions of the reformer, as well as being a safety hazard. Therefore, steam reformers using an LTS catalyst as a reforming catalyst generally include sufficient seals, guards or related mechanisms to minimize or prevent air from contacting the catalyst. Another disadvantage of the LTS catalysts discussed above, as used as methanol steam reforming catalysts, is that the copper oxide component of the catalyst is easily reduced to elemental copper and then sintered at the temperatures in which methanol steam reforming is conducted. The speed at which the LTS catalyst is reduced and then sintered increases as the temperature at which the LTS catalyst is used as a methanol steam reforming catalyst. For example, the LTS catalysts described above tend to be sintered and deactivated within approximately 250 hours or less when used at temperatures at or above 300° C. This active life decreases even further when used at more preferred methanol steam reforming temperatures of at least 350° C., such as 350-425° C. or 375-400° C. The sintered catalyst is deactivated and therefore decreases the ability of the steam reformer to produce hydrogen gas from the feed stream.

The present disclosure is directed to methanol steam reforming catalysts that do not exhibit one or both of the above-described disadvantages of copper-zinc LTS catalysts while still providing a comparable, or even greater, conversion of the feed stream into hydrogen gas. By "comparable," it is meant at least within 50% thereof, and preferably at least 75% or even at least 90% thereof. The methanol steam reforming (MSR) catalyst also should not be reduced from an oxidized state and deactivated during use as a steam reforming catalyst in the temperature range of 300-500° C. As such, the steam reforming catalyst will have a much longer useful life than LTS catalysts when used as a methanol steam reforming catalyst. Preferably, such catalysts, when used in a properly operating methanol steam reformer will have useful lives (at least 75% of their original activity) of at least 1000 hours, and preferably at least 2000, 2000-5000, or even more than 5000 hours. Described in other terms, the MSR catalysts according to the present disclosure may be described as having an initial, or maximum, activity before the catalyst has been used to produce the reformate, or mixed gas, stream from the feed stream, and a second, or after-reforming, activity that corresponds to the activity of the MSR catalyst after a selected number of hours of use of the catalyst to produce the reformate stream. As discussed, this after-reforming activity is preferably at least 75% of the initial activity after selected time periods of 1000 hours, 2000 hours, 5000 hours, or more.

A methanol steam reforming catalyst according to the present disclosure is additionally or alternatively not pyrophoric. A benefit of such a catalyst is that the reforming catalyst beds do not need to be shielded or otherwise isolated from contact with air to prevent spontaneous combustion of the catalyst, as is typically required for LTS catalysts. Therefore, the reforming catalyst beds (such as bed(s) 36) may be air permeable or otherwise exposed to air.

An example of a suitable methanol steam reforming catalyst according to the present disclosure contains zinc oxide as an active component and does not contain copper oxide as an active component. By "active," it is meant that the component takes part in, or otherwise promotes, the methanol steam reforming reaction and the component is present in at least 3 wt % and often at least 5 or 10 wt % of the active components in the composition. Preferably, but not necessarily in all embodiments, the MSR catalyst contains zinc oxide and chromium oxide as active components. In such a catalyst, the chromium oxide enhances the activity of the zinc oxide. These MSR catalysts may contain at least 20% zinc oxide, and preferably contain 25-80% zinc oxide. For example, the catalyst may contain 30-70% zinc oxide, 40-60% zinc oxide, or approximately 50% zinc oxide. Similarly, the MSR catalyst may contain at least 20% chromium oxide, and preferably contains 25-80% chromium oxide. For example, the catalysts may contain 30-70% chromium oxide, 40-60% chromium oxide, or approximately 50% chromium oxide.

An example of a composition that may be used as a MSR catalyst according to the present disclosure and which exhibits both of the above-discussed properties is sold under the trade name KMA by Süd Chemie. KMA is designed to be used as a high temperature methanol synthesis catalyst. By "high temperature" it is meant a temperature greater than 700° C. and typically in the range of 700-900° C. For example, in contrast to an LTS catalyst, KMA has very little activity in the conventional temperature ranges in which LTS catalysts are used, such as 200-275° C. Although not designed or intended to be used as a MSR catalyst, experiments have demonstrated that KMA is an effective methanol steam reforming catalyst. For example, when 8.9 grams of KMA was used to steam reform methanol at 400° C., 6 mL/min of hydrogen gas was produced. As a comparison, 5.8 grams of T2617 operating at 300° C. produced a similar conversion. However, T2617, a copper-based LTS catalyst, not only has a significantly shorter useful life as a MSR catalyst operating in the range of 300-500° C., but also is pyrophoric.

Another example of a suitable MSR catalyst according to the present disclosure is a catalyst that contains zinc oxide supported on calcium aluminate. Similar to KMA, this MSR catalyst is not pyrophoric and is not reduced and deactivated by sintering during use. For example, the catalyst may contain up to approximately 95% zinc oxide and at least approximately 3% calcium aluminate. Other illustrative examples of possible compositions include 25-80% zinc oxide, 50-90% zinc oxide, and 70-95% zinc oxide. Similarly, the MSR catalyst may contain at least 5% calcium aluminate, 10-30% calcium aluminate, 25-75% calcium aluminate or 40-60% calcium aluminate. An example of such a catalyst is sold under the trade name G72-E from Süd Chemie. G72-E is designed to be used as a sulfur absorbent material but has proven effective as a MSR catalyst.

Preferably, the above-described MSR catalysts are free from copper oxide. However, it is within the scope of the disclosure that copper oxide may be present in small quantities, such as less than 5% and preferably less than 1%. Other examples of MSR catalysts that offer some performance benefits over the copper-zinc LTS catalysts discussed above (especially when operated at a temperature at or above 300° C.) include high temperature shift catalysts that contain iron oxide. Again, these catalysts are designed for high temperature and/or pressure operation to produce methanol. However, and as discussed herein, the present disclosure is directed to using these catalysts at a moderate (300-500° C.) temperature to produce hydrogen from methanol via steam reforming. Iron oxide is somewhat pyrophoric, but much less so than the copper-zinc LTS catalysts discussed above. Therefore, compared to copper-zinc LTS catalysts, these catalysts offer greater safety and reduced risk of fire when exposed to air. Similar to copper-zinc LTS catalysts, however, these iron oxide-based catalysts may be reduced and deactivated through sintering during use.

A further property that may be exhibited by MSR catalysts according to the present disclosure, either alone or in combination with one or more of the above properties, is that the MSR catalyst does not produce methane during the methanol steam reforming process. For example, many high temperature shift catalysts and methanol synthesis catalysts, such as iron-based catalysts, produce approximately 1-5% methane during a methanol steam reforming reaction. This production of methane, while not detrimental to many applications for product hydrogen stream 14, and which may be removed or reduced in concentration in a subsequent separation and/or purification step, still reduces the overall yield of hydrogen gas because some of the methanol is reacted to form methane instead of hydrogen gas. KMA and other zinc oxide MSR catalysts meeting the criteria described herein and which do not contain iron oxide as an active component do not tend to produce methane when used as a MSR catalyst in the operating conditions described herein for steam reformer 13.

Hydrogen gas will be the majority, or primary, component of reformate stream 20. Although reformate stream 20 contains a substantial amount of hydrogen gas, the stream may also be referred to as a mixed gas stream because it also contains gases other than hydrogen gas. Examples of these gases include carbon dioxide, carbon monoxide, water, methane and/or unreacted methanol or other carbon-containing feedstock. Reformate stream 20 may contain sufficiently pure hydrogen gas and/or sufficiently low concentrations of the non-hydrogen components to be used for a desired application. In such a situation, the product hydrogen stream may be formed directly from the reformate stream. For the purposes of the present disclosure, substantially pure hydrogen gas refers to streams that contain at least 90% hydrogen gas, preferably greater than 95% hydrogen gas, more preferably greater than 99% hydrogen gas, and even more preferably greater than 99.5% hydrogen gas. Illustrative examples of suitable structures for steam reforming fuel processors for use with the reforming catalysts disclosed herein are disclosed in U.S. Pat. Nos. 6,221,117, 5,997,594, 5,861,137, and pending U.S. patent application Ser. No. 09/802,361. The complete disclosures of the above-identified patents and patent application are hereby incorporated by reference for all purposes.

However, many applications require hydrogen gas that has greater purity and/or a reduced concentration of one or more non-hydrogen components that is present in reformate stream 20. Therefore, steam reformer 13 may, but is not required to, include a separation region 22 in which the hydrogen purity of the reformate stream is increased and/or the concentration of at least one non-hydrogen component is reduced. As shown in FIG. 1, separation region 22 receives the reformate stream and produces a hydrogen-rich stream 24 therefrom. Hydrogen-rich stream 24 has a greater concentration (or purity) of hydrogen gas than reformate stream 20 and/or has a reduced concentration of at least one non-hydrogen component of the reformate stream.

Separation region 22 may utilize any suitable separation structure and/or utilize any suitable mechanism, including a pressure-driven mechanism or separation process, to increase the purity of stream 20 and/or remove selected components therefrom, such as to separate reformate stream 20 into hydrogen-rich stream 24 and byproduct stream 26. Although only a single one of each of these streams has been schematically illustrated in FIG. 1, it is within the scope of the present disclosure that separation region 22 may produce more than one of each of these streams, which may thereafter be combined before or after leaving the separation region. Similarly, although schematically illustrated as streams in FIG. 1, it is within the scope of the present disclosure that the byproduct stream may be formed from a portion of stream 20 that is removed from the stream and stored or otherwise retained within the separation region and thereafter removed, such as during servicing, replacement of the containment structure, etc. It is also within the scope of the present disclosure that steam reformer 13 may utilize more than one separation region and/or may utilize more than one type of process and/or structure for increasing the concentration of hydrogen gas and/or reducing the concentration of selected non-hydrogen components relative to reformate stream 20.

An example of a suitable separation structure for separation region 22 is one or more hydrogen-permeable and/or hydrogen-selective membranes, such as schematically illustrated in FIG. 1 at 46. The membranes may be formed of any hydrogen-permeable material suitable for use in the operating environment and parameters in which separation region 22 is operated. Examples of suitable materials for membranes 46 include palladium and palladium alloys, and especially thin films of such metals and metal alloys. Palladium alloys have proven particularly effective, especially palladium with 35 wt % to 45 wt % copper. A palladium-copper alloy that contains approximately 40 wt % copper has proven particularly effective, although other relative concentrations and components may be used within the scope of the disclosure.

Hydrogen-selective membranes are typically formed from a thin foil that is approximately 0.001 inches thick. It is within the scope of the present disclosure, however, that the membranes may be formed from other hydrogen-permeable and/or hydrogen-selective materials, including metals and metal alloys other than those discussed above as well as non-metallic materials and compositions, and that the membranes may have thicknesses that are greater or less than discussed above. For example, the membrane may be made thinner, with commensurate increase in hydrogen flux. Examples of suitable mechanisms for reducing the thickness of the membranes include rolling, sputtering and etching. A suitable etching process is disclosed in U.S. Pat. No. 6,152,995, the complete disclosure of which is hereby incorporated by reference for all purposes. Examples of various membranes, membrane configurations, and methods for preparing the same are disclosed in U.S. Pat. Nos. 6,562,111 and 6,537,352, 6,319,306, and 6,221,117, the complete disclosures of which are hereby incorporated by reference for all purposes.

Another example of a suitable pressure-separation process for use in separation region 22 is pressure swing absorption. Accordingly, separation region 22 may include one or more pressure-swing adsorption systems, such as schematically illustrated in dash-dot lines in FIG. 1. In a pressure swing adsorption (PSA) process, or system, gaseous impurities are removed from a stream containing hydrogen gas. PSA is based on the principle that certain gases, under the proper conditions of temperature and pressure, will be adsorbed onto an adsorbent material more strongly than other gases. Typically, it is the impurities that are adsorbed and thus removed from reformate stream 20. The success of using PSA for hydrogen purification is due to the relatively strong adsorption of common impurity gases (such as CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent material. Impurity gases such as $NH_3$, $H_2S$, and $H_2O$ adsorb very strongly on the adsorbent material and are therefore removed from stream 20 along with other impurities. If the adsorbent material is going to be regenerated and these impurities are present in stream 20, separation region 22 preferably includes a suitable device that is adapted to remove these impurities prior to delivery of stream 20 to the adsorbent material because it is more difficult to desorb these impurities.

Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites, especially 5 Å (5 angstrom) zeolites. The adsorbent material is commonly in the form of pellets and it is placed in a cylindrical pressure vessel utilizing a conventional packed-bed configuration. Other suitable adsorbent material compositions, forms and configurations may be used without departing from the scope of the present disclosure.

Yet another example of a suitable process for separation region 22 is a chemical process, in which one or more non-hydrogen components of the reformate stream are chemically reacted to form additional hydrogen gas and/or to form components that are more desirable than the components that are removed from the reformate stream. Illustrative examples of chemical separation processes include the use of at least one methanation catalyst bed to produce methane from carbon monoxide and suitable structure for performing the water-gas shift reaction to produce hydrogen gas from water and carbon monoxide present in the reformate stream.

For example, in the context of a steam reformer that is producing a fuel stream for a fuel cell stack containing a plurality of fuel cells, many fuel cells are subject to damage if exposed to certain components, such as carbon monoxide and/or carbon dioxide above certain threshold concentrations. For at least many conventional proton-exchange membrane (PEM) fuel cells, the concentration of carbon monoxide should be less than 10 ppm (parts per million). Preferably, the system limits the concentration of carbon monoxide to less than 5 ppm, and even more preferably, to less than 1 ppm. The concentration of carbon dioxide may be greater than that of carbon monoxide. For example, concentrations of less than 25% carbon dioxide may be acceptable. Preferably, the concentration is less than 10%, and even more preferably, less than 1%. Especially preferred concentrations are less than 50 ppm. The acceptable maximum concentrations presented herein are illustrative examples, and concentrations other than those presented herein may be used and are within the scope of the present disclosure. For example, particular users or manufacturers may require minimum or maximum concentration levels or ranges that are different than those identified herein. Similarly, when steam reformers according to the present disclosure are used with a fuel cell stack that is more tolerant of these impurities, then the product hydrogen stream may contain larger amounts of these gases. Similarly, when the steam reformers are used to produce product hydrogen streams that are used for applications other than as a fuel stream for a fuel cell stack, it may be desirable to remove other components from the product hydrogen stream and/or it may not be necessary to utilize a separation process.

Figure 2:
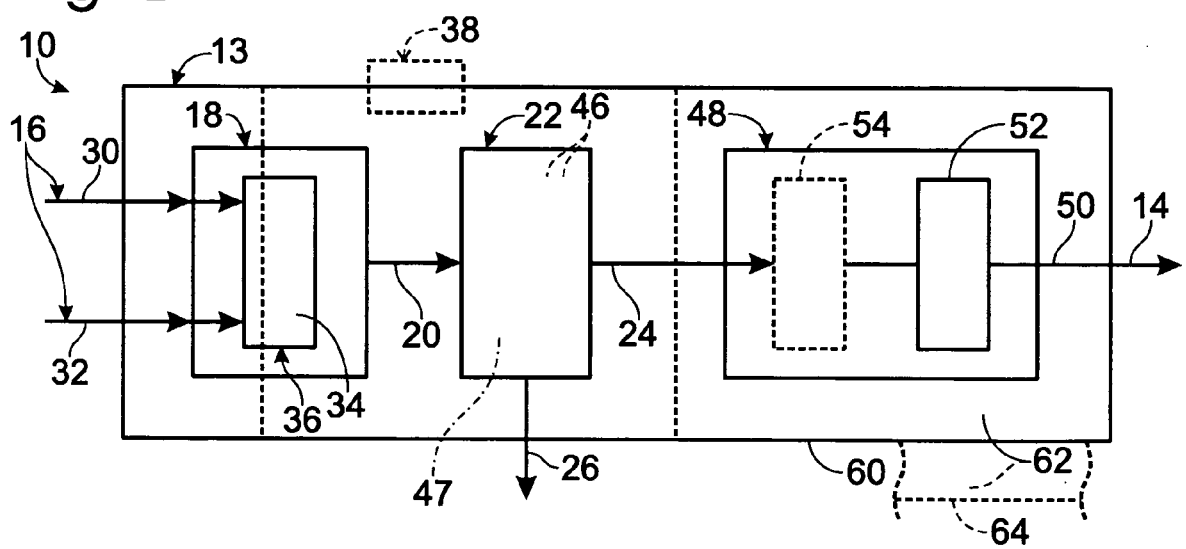
FIG. 2 is a schematic view of the fuel processing system of FIG. 2, further including a polishing region.

As discussed, steam reformer 13 may utilize more than one type of separation process and/or include or be associated with more than one type of separation structure. An illustrative example of a steam reformer that includes two different types of separation structures (or utilizes two different types of separation processes) is shown in FIG. 2. As shown, the reformer includes a separation region 22, as well as a second separation region, which is generally indicated at 48 and which is downstream from separation region 22. In such a configuration, the reformer may be described as having two separation regions in series, and/or as having a primary and a secondary separation region. Separation region 48 may include any of the structure, elements, subelements, variations and the like as disclosed and/or incorporated herein within respect to region 22. In the series configuration shown in FIG. 2, separation region 48 may be referred to as a polishing region, in that it is treating the hydrogen-rich stream that has already been treated by separation region 20 and therefore should have a greater hydrogen purity and/or reduced concentration of at least one non-hydrogen component, as compared to reformate stream 20.

As shown, polishing region 48 is adapted to receive hydrogen-rich stream 24 from separation region 22 (or alternatively, reformate stream 20 from reforming region 18), and further purifies the stream by reducing the concentration of, or removing, selected components therein. In FIG. 2, the purified hydrogen stream is indicated schematically at 50 and at least a substantial portion of this stream forms product hydrogen stream 14. Region 48 includes any suitable structure for removing or reducing the concentration of the selected compositions in stream 24. For example, when the product hydrogen stream is intended for use in a PEM fuel cell stack or other device that will be damaged if the stream contains more than determined concentrations of carbon monoxide or carbon dioxide, it may be desirable to include a methanation catalyst 52. Methanation catalyst 52 converts carbon monoxide and carbon dioxide into methane and water, both of which will not damage a PEM fuel cell stack. Polishing region 48 may (but is not required to) also include steam reforming catalyst 54 to convert any unreacted feedstock into hydrogen gas. Catalyst 54 may be described as a downstream, or secondary, reforming region. In such an embodiment, it is preferable that the reforming catalyst is upstream from the methanation catalyst so as not to reintroduce carbon dioxide or carbon monoxide downstream of the methanation catalyst.

In FIG. 2, steam reformer 13 is shown including a shell 60 in which the above-described components are contained. Shell 60, which also may be referred to as a housing, enables the components of the steam reformer to be moved as a unit. It also protects the components of the steam reformer from damage by providing a protective enclosure and reduces the heating demand of the fuel processor because the components of the fuel processor may be heated as a unit. Shell 60 may, but does not necessarily, include insulating material 62, such as a solid insulating material, blanket insulating material, and/or an air-filled cavity. It is within the scope of the disclosure, however, that the steam reformer may be formed without a housing or shell. When steam reformer 13 includes insulating material 62, the insulating material may be internal the shell, external the shell, or both. When the insulating material is external a shell containing the above-described reforming, separation and/or polishing regions, the steam reformer may further include an outer cover or jacket 64 external the insulation, as schematically illustrated in FIG. 2.

It is further within the scope of the disclosure that one or more of the components of steam reformers according to the present disclosure may (but are not required to) either extend beyond the shell or be located external at least shell 60. For example, and as schematically illustrated in FIG. 2, polishing region 48 may be external shell 60 and/or a portion of hydrogen-producing region 18 (such as portions of one or more reforming catalyst beds) may extend beyond the shell.

Figure 3:
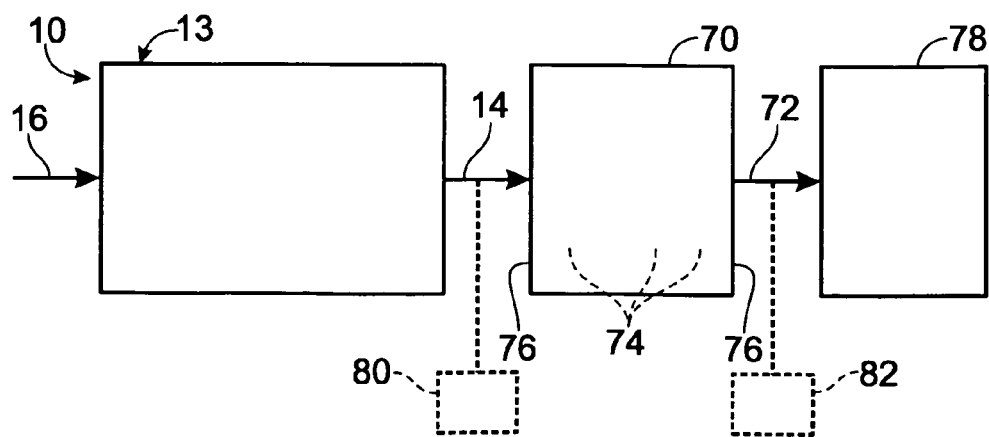
FIG. 3 is a schematic view of a fuel cell system that includes a steam reformer according to the present disclosure.

As schematically illustrated in FIG. 3, steam reformers according to the present disclosure may be adapted to deliver at least a portion of product hydrogen stream 14 to at least one fuel cell stack 70. Fuel cell stack 70 receives the portion of the product hydrogen stream and an oxidant and produces an electric current therefrom. Illustrative examples of suitable oxidants include air, oxygen gas, oxygen-enriched air, and the oxidant stream may be delivered to the fuel cell stack via any suitable mechanism.

When a fuel processing system is used in combination with a fuel cell stack, the collective system be referred to as a fuel cell system 72. Although the reformer has been indicated at 13 in FIG. 3, it is within the scope of the present disclosure that any of the steam reformers disclosed, illustrated and/or incorporated herein may be incorporated into a fuel cell system. Fuel cell stack 70 is adapted to produce an electric current from the portion of product hydrogen stream 14 delivered thereto. In the illustrated embodiment, a single steam reformer 13 and a single fuel cell stack 70 are shown and described. However, more than one of either or both of these components may be used. It is also within the scope of the present disclosure that these components have been schematically illustrated and that the fuel cell system may include additional components that are not specifically illustrated in the Figures, such as feed pumps, air delivery systems, heat exchangers, controllers, flow-regulating structures, sensor assemblies, heating assemblies, power management modules, and the like.

Fuel cell stack 70 contains at least one, and typically multiple, fuel cells 74 that are adapted to produce an electric current from the portion of the product hydrogen stream 14 delivered thereto. A fuel cell stack typically includes multiple fuel cells 74 joined together between common end plates 76, which contain fluid delivery/removal conduits (not shown). Examples of suitable fuel cells include proton exchange membrane (PEM) fuel cells and alkaline fuel cells. Fuel cell stack 70 may receive all of product hydrogen stream 14. Some or all of stream 14 may additionally, or alternatively, be delivered, via a suitable conduit, for use in another hydrogen-consuming process, burned for fuel or heat, or stored for later use. For example, and as illustrated in dashed lines in FIG. 3, it is within the scope of the disclosure that at least a portion of the product hydrogen stream produced by the steam reformer may be at least temporarily stored in a suitable hydrogen storage device 80. Illustrative examples of suitable storage devices for hydrogen gas include pressurized tanks and hydride beds. When fuel cell system 72 includes a steam reformer and a hydrogen storage device 80, the hydrogen gas that is delivered to fuel cell stack 70 may come from reformer 13, storage device 80, or both. Fuel processing and fuel cell systems according to the present disclosure may also be constructed without a hydrogen storage device.

The electric current produced by the stack may be used to satisfy the energy demands, or applied load, of at least one associated energy-consuming device 78. Illustrative examples of devices 78 include, but should not be limited to, any combination of one or more motor vehicles, recreational vehicles, industrial or construction vehicles, boat or other seacraft, tools, lights or lighting assemblies, appliances (such as a household or other appliance), households, commercial offices or buildings, neighborhoods, industrial equipment, signaling or communication equipment, the balance-of-plant electrical requirements for the fuel cell system, etc. In short, device 78 is schematically illustrated in FIG. 3 and intended to represent one or more devices or collections of devices that are adapted to apply an electrical load to the fuel cell system. It is within the scope of the present disclosure that the fuel cell system may (but is not required to) include at least one energy-storage device, such as schematically illustrated in FIG. 3 at 82, which is adapted to store at least a portion of the current produced by fuel cell stack 70. Described in other words, the current may establish a potential that may be later used to satisfy an applied load, such as from energy-consuming device 78. An illustrative example of a suitable energy-storage device 82 is a battery, but others may be used, such as ultra capacitors and flywheels. Device 82 may additionally or alternatively be used to power the fuel cell system, such as during startup of the system. The load applied from device 78 may be applied to and/or satisfied by the device 82, fuel cell stack 70, or both.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A fuel processing system, comprising:
 a feedstock delivery system configured to provide a feed stream comprising methanol and water, wherein the feed stream has a methanol to water molar ratio of approximately 1:1;
 a steam reforming region containing at least one steam reforming catalyst bed and adapted to receive the feed stream comprising water and methanol;
 means for heating the reforming region to a temperature in the range of approximately 350-425° C. and vaporizing the feed stream;
 a catalyst within the at least one reforming catalyst bed and adapted to catalyze the formation of a mixed gas stream comprising hydrogen gas and other gases by steam reforming of the feed stream at a temperature in the range of approximately 350-425° C., wherein hydrogen gas is a majority component of the mixed gas stream, wherein the catalyst contains a mixture that includes 40-60 wt % zinc oxide, 40-60 wt % chromium oxide, and copper oxide, and further wherein the catalyst contains less than approximately 5 wt % copper oxide; and
 a separation region adapted to receive the mixed gas stream and to separate the mixed gas stream into a product hydrogen stream and a byproduct stream, wherein the product hydrogen stream has at least one of a greater concentration of hydrogen gas than the mixed gas stream and a reduced concentration of at least one component of the other gases than the mixed gas stream, wherein the byproduct stream contains at least one of a lower concentration of hydrogen gas than the mixed gas stream and a greater concentration of at least one component of the other gases than the mixed gas stream.

2. The system of claim 1, wherein the catalyst is non-pyrophoric.

3. The system of claim 2, wherein the catalyst has an initial activity and a second activity after a period of use, the second activity being at least 75% of the initial activity after at least 1000 hours of use.

4. The system of claim 3, wherein the second activity is at least 75% of the initial activity after 5000 hours of use.

5. The system of claim 1, wherein the catalyst contains less than 3 wt % copper oxide.

6. The system of claim 1, wherein the catalyst does not contain palladium or platinum.

7. The system of claim 1, wherein the catalyst does not produce methane during the production of the mixed gas stream.

8. The system of claim 1, wherein the catalyst is adapted to not be sintered during production of the mixed gas stream.

9. The system of claim 1, wherein the reforming catalyst bed is an air-permeable catalyst bed that does not require shielding or isolation from air to prevent air from contacting the catalyst.

10. The system of claim 1, wherein the separation region includes at least one hydrogen-selective membrane having a first surface that is exposed to the mixed gas stream, wherein the product hydrogen stream is formed from at least a portion of the mixed gas stream that permeates though the at least one hydrogen-selective membrane, and further wherein the byproduct stream is formed from at least a portion of the mixed gas stream that does not pass through the at least one hydrogen-selective membrane.

11. The system of claim 10, wherein the at least one hydrogen selective membrane is formed from an alloy comprising palladium and copper.

12. The system of claim 1, wherein the separation region includes at least one pressure swing adsorption system adapted to receive under pressure the mixed gas stream.

13. The system of claim 1, in combination with a fuel cell stack adapted to receive an oxidant stream and at least a portion of the product hydrogen stream and to produce an electric current therefrom.

14. The system of claim 1, wherein the catalyst is adapted to convert at least 75% of the vaporized feed stream into hydrogen gas.

15. The system of claim 1, wherein the catalyst is adapted to convert at least 90% of the vaporized feed stream into hydrogen gas.

16. The system of claim 1, wherein the catalyst further contains at least 3 wt % calcium aluminate.

17. A method of producing hydrogen gas, comprising:
providing with a feedstock delivery system a feed stream comprising methanol and water; wherein the feed stream has a methanol to water molar ratio of approximately 1:1;
heating a steam reforming region of a fuel processing system with a heated exhaust stream from a heating assembly, wherein the heated exhaust stream has a different composition than the feed stream, and further wherein the steam reforming region includes a catalyst adapted to catalyze the formation of a mixed gas stream comprising hydrogen gas and other gases by steam reforming of the feed stream, wherein the catalyst contains a mixture that includes 40-60 wt % zinc oxide, 40-60 wt % chromium oxide, and copper oxide, and further wherein the catalyst contains less than approximately 5 wt % copper oxide;
vaporizing the feed stream;
delivering the feed stream to the heated steam reforming region;
steam reforming the feed stream in the steam reforming region at a temperature of approximately 350-425° C. to produce a mixed gas stream containing hydrogen gas as a majority component and other eases; and
separating the mixed gas stream into a product hydrogen stream and a byproduct stream, wherein the product hydrogen stream has at least one of a greater concentration of hydrogen gas than the mixed gas stream and a reduced concentration of at least one component of the other gases than the mixed gas stream, wherein the byproduct stream contains at least one of a lower concentration of hydrogen gas than the mixed gas stream and a greater concentration of at least one component of the other gases than the mixed gas stream.

18. The method of claim 17, wherein the method further comprises delivering at least a portion of the mixed gas stream to a fuel cell stack adapted to produce an electrical output therefrom.

19. The method of claim 17, wherein the steam reforming does not include producing methane.

20. The method of claim 17, wherein the catalyst is non-pyrophoric.

21. The system of claim 1, wherein the means for heating includes a combustion region that combusts a fuel stream to produce a heated exhaust stream, and further wherein the combustion region is configured to deliver the heated exhaust stream for heat exchange with the steam reforming region to heat the steam reforming region.

22. The system of claim 1, wherein the means for heating includes an electric resistance heater.

* * * * *

UNITED STATES PATENT AND TRADEMARK OFFICE
CERTIFICATE OF CORRECTION

| | |
|---|---|
| PATENT NO. | : 7,662,195 B2 |
| APPLICATION NO. | : 11/474024 |
| DATED | : February 16, 2010 |
| INVENTOR(S) | : Curtiss Renn |

Page 1 of 1

It is certified that error appears in the above-identified patent and that said Letters Patent is hereby corrected as shown below:

Column 12,
Line 50, in the phrase "that permeates though the at least one" please delete "though" and insert -- through -- therefor.

Signed and Sealed this

Fourth Day of May, 2010

David J. Kappos
*Director of the United States Patent and Trademark Office*